United States Patent
Ding et al.

(10) Patent No.: US 12,331,500 B1
(45) Date of Patent: Jun. 17, 2025

(54) TWO-WATERWAY STRUCTURE FOR FAUCET

(71) Applicant: Danxuan Ding, Ningbo (CN)

(72) Inventors: Danxuan Ding, Ningbo (CN); Qiquan Zhang, Ningbo (CN)

(73) Assignee: Danxuan Ding, Ningbo (CN)

( * ) Notice: Subject to any disclaimer, the term of this patent is extended or adjusted under 35 U.S.C. 154(b) by 0 days.

(21) Appl. No.: 19/008,695

(22) Filed: Jan. 3, 2025

(51) Int. Cl.
*E03C 1/05* (2006.01)
*F16K 11/00* (2006.01)

(52) U.S. Cl.
CPC ............ *E03C 1/057* (2013.01); *F16K 19/006* (2013.01)

(58) Field of Classification Search
CPC . E03C 1/057; E03C 1/055; E03C 1/05; F16K 19/006
See application file for complete search history.

(56) References Cited

U.S. PATENT DOCUMENTS

| | | | | |
|---|---|---|---|---|
| 7,445,024 B2* | 11/2008 | Paterson | ................ | E03C 1/057 137/606 |
| 9,194,110 B2* | 11/2015 | Frick | ...................... | E03C 1/055 |
| 9,341,278 B2* | 5/2016 | Esche | ................ | F16K 37/0041 |
| 9,347,207 B2* | 5/2016 | Chen | ..................... | F16K 11/074 |
| 9,458,612 B2* | 10/2016 | Thomas | .............. | F16K 31/0675 |
| 9,783,964 B2* | 10/2017 | Thompson | ............ | G05B 15/02 |
| 9,816,634 B2* | 11/2017 | Wawrla | ................... | E03C 1/044 |
| 9,840,832 B2* | 12/2017 | Seggio | .................... | E03C 1/057 |
| 9,919,939 B2* | 3/2018 | Rosko | ....................... | C02F 1/78 |
| 10,036,149 B2* | 7/2018 | Wallerstorfer | ............ | H02P 8/22 |
| 10,450,732 B2* | 10/2019 | Xia | ........................ | F16K 19/006 |
| 10,675,573 B2* | 6/2020 | Miller | ..................... | C02F 1/003 |
| 10,982,419 B2* | 4/2021 | Baker | .................. | E03C 1/0408 |
| 11,377,830 B2* | 7/2022 | Davis | ................... | G05D 7/0635 |
| 11,434,627 B2* | 9/2022 | Feng | ..................... | F16K 19/006 |
| 11,655,620 B2* | 5/2023 | Zhang | ..................... | F16K 11/22 137/78.1 |
| 11,686,398 B1* | 6/2023 | Huang | .................. | E03C 1/0412 137/605 |
| 11,761,185 B2* | 9/2023 | Zhang | ................... | F16K 19/006 4/623 |
| 11,821,185 B2* | 11/2023 | Zhang | ..................... | E03C 1/057 |
| 11,834,816 B2* | 12/2023 | Zhang | .................. | F16K 19/006 |
| 12,000,125 B2* | 6/2024 | Yan | ............. | G01F 1/58 |
| 12,006,672 B2* | 6/2024 | Zhang | .................. | F16K 31/602 |
| 2024/0295102 A1* | 9/2024 | Garcia | ................. | F16K 19/006 |

FOREIGN PATENT DOCUMENTS

| | | | | |
|---|---|---|---|---|
| EP | 3736386 A1 | * | 11/2020 | |
| WO | WO-2004051128 A1 | * | 6/2004 | ........... B67D 1/1204 |
| WO | WO-2012125054 A2 | * | 9/2012 | ............. E03C 1/057 |

* cited by examiner

*Primary Examiner* — David Colon-Morales
(74) *Attorney, Agent, or Firm* — Jose Cherson Weissbrot

(57) ABSTRACT

A two-waterway structure for a faucet that includes: a first pipe, which is configured for water intake; a second pipe, which is configured for water intake and is provided with a manual switch configured to control the connection and disconnection of waterway in the second pipe; and a water outlet pipe, which is configured for water output, an end portion of the first pipe and an end portion of the second pipe being both connected to an end portion of the water outlet pipe to form a three-way pipe structure. The two-waterway structure for a faucet can ensure smooth water delivery even when the waterway controlled by the solenoid valve is damaged.

9 Claims, 4 Drawing Sheets

TWO-WATERWAY STRUCTURE FOR FAUCET

TECHNICAL FIELD

The disclosure relates to the field of faucets, and in particular to a two-waterway structure for a faucet.

BACKGROUND ART

With the technical development of faucet devices, a faucet device controlled by a solenoid valve has been widely used on the market at present. The solenoid valve is connected to an inductive sensor. When a user's hand approaches the inductive sensor, the solenoid valve opens, and water flows out of the faucet device for the user to use; and when the user's hand is away from the inductive sensor, the solenoid valve is closed, and the faucet device stops supplying water. In this way, controlling a faucet device by a solenoid valve is more convenient for users to use. However, for an existing faucet device controlled by a solenoid valve, the faucet device cannot supply water when damaged, which seriously affects the daily life of the users.

SUMMARY

In order to overcome the disadvantages of the prior art, the disclosure aims to provide a two-waterway structure for a faucet. The two-waterway structure for a faucet can ensure smooth water delivery even when the waterway controlled by the solenoid valve is damaged.

The disclosure provides a two-waterway structure, including: a first pipe, which is configured for water intake and is provided with a solenoid valve configured to control the connection and disconnection of waterway in the first pipe, the solenoid valve being connected to an inductive sensor; a second pipe, which is configured for water intake and is provided with a manual switch configured to control the connection and disconnection of waterway in the second pipe; and a water outlet pipe, which is configured for water output, an end portion of the first pipe and an end portion of the second pipe being both connected to an end portion of the water outlet pipe to form a three-way pipe structure, wherein a one-way valve is provided at the end portion of the first pipe and is configured to prevent water in the second pipe from flowing into the first pipe; and a filter structure is provided at a junction of the three-way pipe structure, is connected to the one-way valve, and is capable of preventing the one-way valve from blocking the junction of the three-way pipe structure after falling off.

List of reference signs: 1. first pipe; 2. solenoid valve; 3. inductive sensor; 4. second pipe; 5. manual switch; 6. water outlet pipe; 7. end portion of first pipe; 8. end portion of second pipe; 9. end portion of water outlet pipe; 10. three-way pipe structure; 11. one-way valve; 12. junction of three-way pipe structure; 13. filter structure; 14. main body; 15. filter hole; 16. cylindrical opening of main body; 17. plug cap; 18. mounting port; 19. bottom support structure; 20. side support structure; 21. first segment; 22. second segment; 23. valve core; 24. spring; 25. valve seat; 26. hot/cold water inlet end; 27. pre-filter; 28. hot/cold water inlet pipe; 29. battery case.

DETAILED DESCRIPTION OF EMBODIMENTS

Specific embodiments of the disclosure will be described in detail in this section. Preferred embodiments of the disclosure are illustrated in the accompanying drawings. The accompanying drawings serve to supplement the text description of the specification with figures, providing a visual understanding of each technical feature and the overall technical solution of the disclosure, but cannot be construed as a limitation to the scope of protection of the disclosure.

In the description of the disclosure, it should be understood that orientation or position relationships indicated by terms "upper", "lower", "front", "rear", "left", "right", etc. are orientation or position relationships as shown in the accompanying drawings, and these terms are just used to facilitate description of the disclosure and simplify the description, rather than indicating or implying that the mentioned device or element must have a specific orientation and must be constructed and operated in a specific orientation, and thus cannot be construed as a limitation to the disclosure.

In the description of the disclosure, unless otherwise explicitly defined, the words such as "arrange", "mount" and "connect" should be understood in a broad sense, and those skilled in the art can reasonably determine the specific meanings of the above words in the disclosure with reference to the specific contents of the technical solutions.

Figure 1:
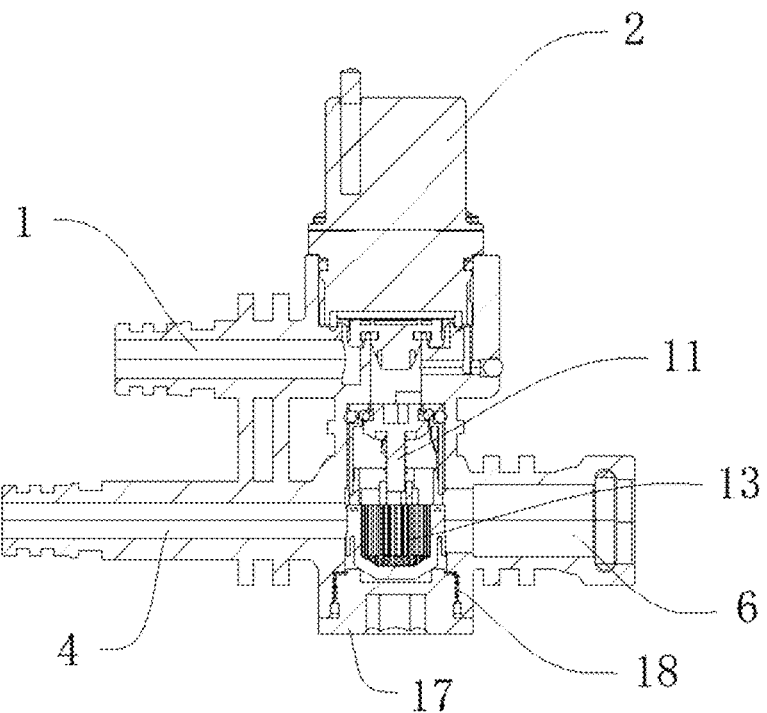
FIG. 1 is a schematic structural diagram of a two-waterway structure according to an embodiment of the disclosure.
Figure 2:
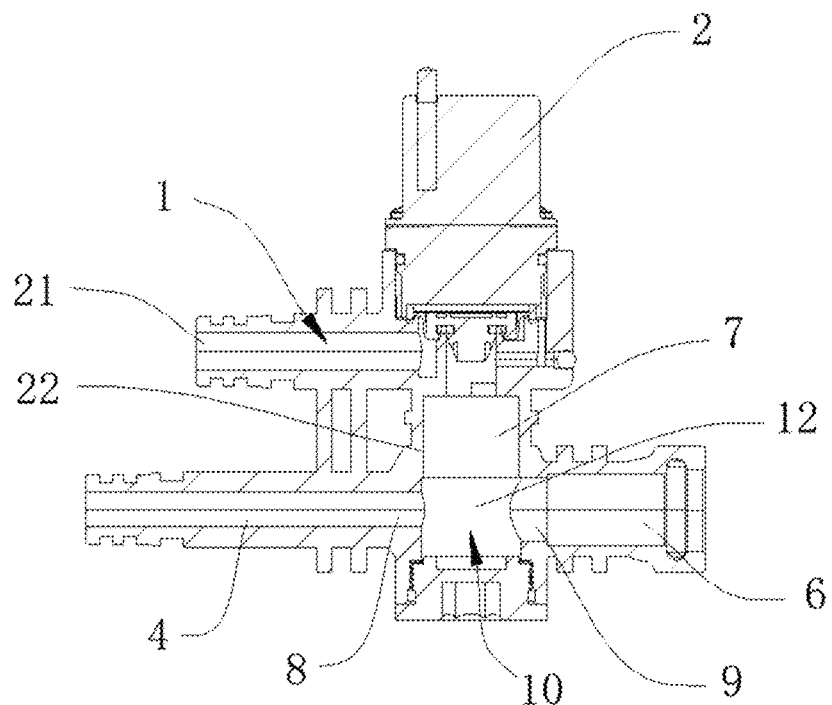
FIG. 2 is a schematic diagram of a two-waterway structure according to an embodiment of the disclosure, with a one-way valve and a filter structure removed.
Figure 6:
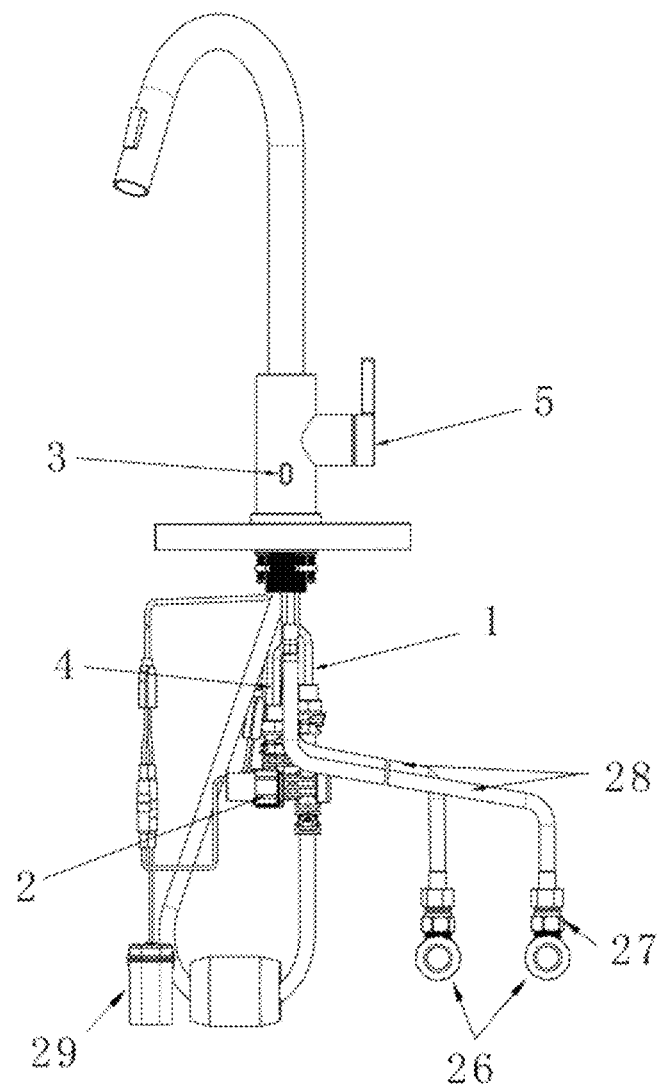
FIG. 6 is a schematic structural diagram of a faucet device according to an embodiment of the disclosure.

Referring to FIGS. 1, 2, and 6, a two-waterway structure for a faucet according to an embodiment of the disclosure includes: a first pipe 1, the first pipe 1 being configured for water intake, the first pipe 1 being provided with a solenoid valve 2, the solenoid valve 2 being configured to control the connection and disconnection of waterway in the first pipe 1, and the solenoid valve 2 being connected to an inductive sensor 3; a second pipe 4, the second pipe 4 being configured for water intake, the second pipe 4 being provided with a manual switch 5, and the manual switch 5 being configured to control the connection and disconnection of waterway in the second pipe 4; and a water outlet pipe 6, the water outlet pipe 6 being configured for water output, and an end portion 7 of the first pipe and an end portion 8 of the second pipe being both connected to an end portion 9 of the water outlet pipe to form a three-way pipe structure 10. A one-way valve 11 is provided at the end portion 7 of the first pipe, and the one-way valve 11 is configured to prevent water in the second pipe 4 from flowing into the first pipe 1. A filter structure 13 is provided at a junction 12 of the three-way pipe structure, the filter structure 13 is connected to the one-way valve 11, and the filter structure 13 can prevent the one-way valve 11 from blocking the junction 12 of the three-way pipe structure after falling off.

With the inductive sensor 3 according to the disclosure, when a user's hand approaches the inductive sensor 3, the solenoid valve 2 opens to enable the waterway in the first pipe 1 to be connected; and when the user's hand is away from the inductive sensor 3, the solenoid valve 2 is closed to enable the waterway in the first pipe 1 to be disconnected.

In the disclosure, the connection between the filter structure 13 and the one-way valve 11 may be abutting, fixed connection or detachable connection, and may also be achieved by other suitable connection methods, which is not limited thereto and may be set according to actual requirements.

In the two-waterway structure according to the disclosure, the first pipe 1 controlled by the solenoid valve 2 and the second pipe 4 controlled by the manual switch 5 are provided, such that when the first pipe 1 controlled by the solenoid valve 2 is damaged, the second pipe 4 controlled by the manual switch 5 can be used to connect and disconnect the waterway so as to ensure smooth water delivery. In the two-waterway structure according to the disclosure, the filter structure 13 is provided at the junction 12 of the three-way pipe structure. On the one hand, the filter structure 13 can achieve a filtering effect, and on the other hand, when the one-way valve 11 falls off, since the filter structure 13 occupies a space at the junction 12 of the three-way pipe structure, the filter structure 13 supports the one-way valve 11 that falls off, such that the filter structure 13 can prevent the one-way valve 11 from blocking the junction 12 of the three-way pipe structure after falling off.

As a preferred embodiment of the two-waterway structure according to the disclosure, the following additional technical features may be further provided.

Figure 3:
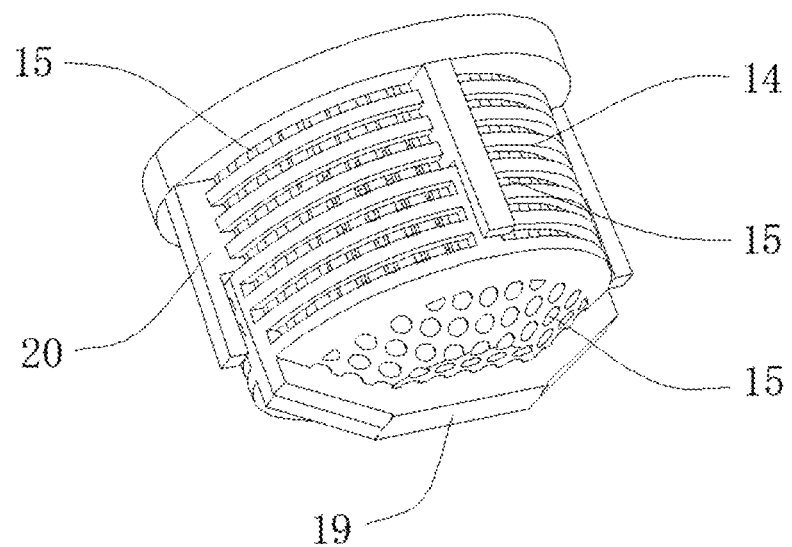
FIG. 3 is a top perspective view of a filter structure according to an embodiment of the disclosure.
Figure 4:
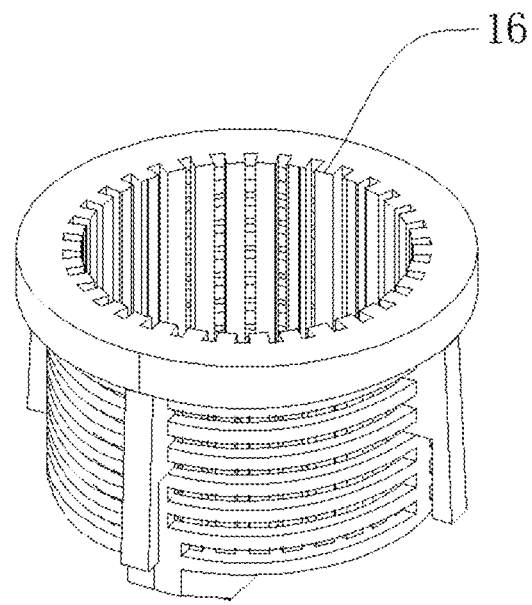
FIG. 4 is a bottom perspective view of a filter structure according to an embodiment of the disclosure.

Referring to FIGS. 3 and 4, in an implementation, the filter structure 13 includes a main body 14, the main body 14 being cylinder-shaped, and a plurality of filter holes 15 being formed in the main body 14. In this way, the main body 14 that is cylinder-shaped can effectively support the one-way valve 11 while keeping the water flowing smoothly. In other implementations, the main body 14 may be in other suitable shapes.

Referring to FIGS. 1 and 4, in an implementation, a cylindrical opening 16 of the main body faces the one-way valve 11, the main body 14 is connected to the one-way valve 11, and a wall at the junction 12 of the three-way pipe structure can support an end of the main body 14 opposite to the cylindrical opening 16 of the main body. In this way, the main body 14 can effectively support the one-way valve 11, and can prevent the one-way valve 11 from falling off, and thus prevent the one-way valve 11 from blocking the junction 12 of the three-way pipe structure after falling off. In other implementations, the wall at the junction 12 of the three-way pipe structure may not support the end of the main body 14 opposite to the cylindrical opening 16 of the main body at first, and when the one-way valve 11 falls off, the one-way valve 11 may be pushed under the impact of water flow, the one-way valve 11 then pushes the main body 14 to move, and then the wall at the junction 12 of the three-way pipe structure supports the end of the main body 14 opposite to the cylindrical opening 16 of the main body, so as to support the one-way valve 11 to prevent the one-way valve 11 from blocking the junction 12 of the three-way pipe structure after falling off.

In an implementation, the three-way pipe structure 10 can hold the main body 14 to prevent the main body 14 from in a direction perpendicular to the end portion 7 of the first pipe, which allows the main body 14 to be mounted more stably so as to prevent the main body 14 from loosening to prevent the one-way valve 11 from blocking the junction 12 of the three-way pipe structure after falling off, achieving higher reliability, and which can also prevent the main body 14 from making noise due to wobbling. In other implementations, the structure described above may also be replaced with other suitable structures.

Referring to FIG. 1, in an implementation, the two-waterway structure further includes a plug cap 17, a mounting port 18 is provided at the three-way pipe structure 10, the mounting port 18 extends through the wall at the junction of the three-way pipe structure 10, the junction of the three-way structure is in communication with the outside via the mounting port 18, the plug cap 17 can be detachably arranged at the mounting port 18 to plug the mounting port 18, and the plug cap 17 forms the wall at the junction of the three-way structure. With the structure described above, when the junction of the three-way structure is blocked, the plug cap 17 can be opened for inspection and maintenance to ensure that the two-waterway structure according to the disclosure has unobstructed waterway. In addition, the plug cap 17 may also be opened in order to mount the one-way valve and the filter structure 13 of the two-waterway structure according to the disclosure, so that the mounting is more convenient. In other implementations, it is also possible that the two-waterway structure does not include the plug cap 17, and there is no mounting port 18 at the three-way pipe structure 10.

In an implementation, the plug cap 17 is in threaded connection with the mounting port 18, which, on the one hand, makes it easier to remove and mount the plug cap 17, and on the other hand, achieves better sealing between the plug cap 17 and the mounting port 18. In other implementations, the threaded connection between the plug cap 17 and the mounting port 18 may be replaced with other suitable connection methods.

Referring to FIG. 3, in an implementation, the filter structure 13 further includes a bottom support structure 19. The bottom support structure 19 is arranged on an outer surface of the main body 14, and the bottom support structure 19 is configured to abut against the plug cap 17 to support the main body 14. With the structure described above, it is possible to prevent the outer surface of the main body 14 from directly coming into contact with the plug cap 17, thereby reducing the wear of the main body 14. In other implementations, the filter structure 13 may not include the bottom support structure 19.

In an implementation, the filter structure 13 further includes a side support structure 20. The side support structure 20 is arranged on the outer surface of the main body 14, and the side support structure is configured to abut against the wall of the three-way pipe to prevent the main body 14 from wobbling in the direction perpendicular to the end portion of the first pipe 1 connected to the water outlet pipe 6. With the structure described above, it is possible to prevent the outer surface of the main body 14 from directly coming into contact with the wall of the three-way pipe, thereby reducing the wear of the main body 14. In other implementations, the filter structure 13 may not include the side support structure 20.

Referring to FIG. 2, in an implementation, the first pipe 1 includes a first segment 21 and a second segment 22. The first segment 21 and the second segment 22 are perpendicular to each other. One end of the second segment 22 is connected to an end portion of the first segment 21, and the other end of the second segment 22 is connected to the water outlet pipe 6. The second pipe 4 and the first segment 21 are parallel to each other, and the second pipe 4 and the water outlet pipe 6 are on the same line. With the structure described above, the positions of the first pipe 1 and the second pipe 4 can be distributed reasonably, so that the two-waterway structure according to the disclosure achieves the optimal implementation effect. In other implementations, the first pipe 1 may be of other suitable structures. In other implementations, the first pipe 1 and the second pipe 4 may be arranged in other suitable distribution manners.

Figure 5:
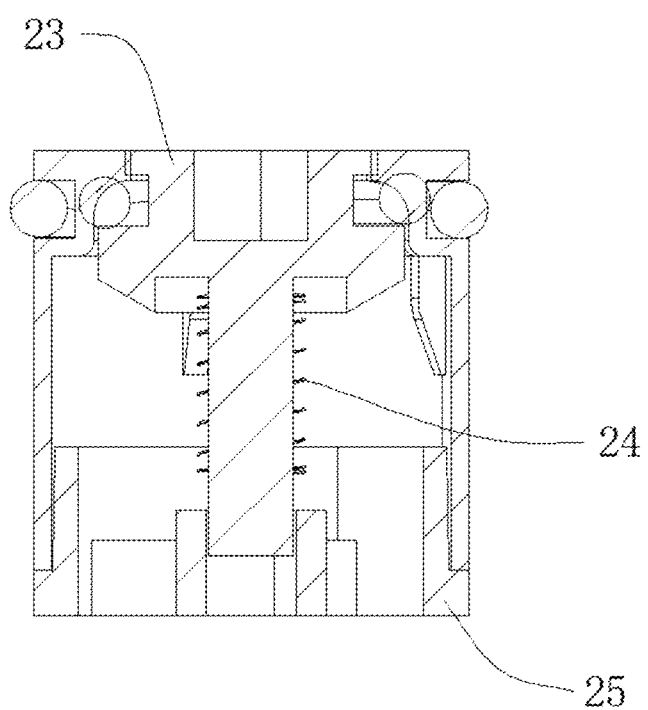
FIG. 5 is a schematic structural diagram of a one-way valve according to an embodiment of the disclosure.

Referring to FIG. 5, in an implementation, the one-way valve 11 includes a valve core 23, a spring 24 and a valve seat 25. The valve seat 25 is connected to the filter structure 13, and the valve core 23 can move on the valve seat 25 to control the opening and closing of the end portion of the first pipe 1 connected to the water outlet pipe 6. One end of the spring 24 abuts against the valve core 23, and the other end of the spring 24 abuts against the valve seat 25. When the waterway of the first pipe 1 is connected, the water flow rushes to the valve core 23, the spring 24 is compressed, and the end portion of the first pipe 1 connected to the water outlet pipe 6 opens, such that the water in the first pipe 1 can flow into the water outlet pipe 6; and when the waterway of the first pipe 1 is disconnected, the spring 24 pushes the valve core 23 to block the end portion of the first pipe 1 connected to the water outlet pipe 6, so as to prevent the water flow from flowing into the first pipe 1 after the waterway of the second pipe 4 is connected.

Those skilled in the art can freely combine and use the above additional technical features provided that no conflict occurs.

The faucet device generally includes hot/cold water inlet ends 26, pre-filters 27, hot/cold water inlet pipes 28, a battery case 29, etc., which are general knowledge to those skilled in the art. The specific structure of the faucet device will not be described in detail herein.

The foregoing implementations are only preferred implementations of the disclosure and cannot be used to limit the scope of protection of the disclosure. All non-essential modifications and substitutions made by those skilled in the art on the basis of the disclosure shall fall within the scope of protection of the disclosure.

The invention claimed is:

1. A two-waterway structure for a faucet, the two-waterway structure comprising:
 a first pipe, which is configured for water intake and is provided with a solenoid valve configured to control the connection and disconnection of waterway in the first pipe, the solenoid valve being connected to an inductive sensor;
 a second pipe, which is configured for water intake and is provided with a manual switch configured to control the connection and disconnection of waterway in the second pipe; and
 a water outlet pipe, which is configured for water output, an end portion of the first pipe and an end portion of the second pipe being both connected to an end portion of the water outlet pipe to form a three-way pipe structure, wherein a one-way valve is provided at the end portion of the first pipe and is configured to prevent water in the second pipe from flowing into the first pipe; and a filter structure is provided at a junction of the three-way pipe structure, is connected to the one-way valve, and is capable of preventing the one-way valve from falling off and blocking the junction of the three-way pipe structure.

2. The two-waterway structure according to claim 1, wherein the first pipe comprises a first segment and a second segment perpendicular to each other, one end of the second segment being connected to an end portion of the first segment, and the other end of the second segment being connected to the water outlet pipe; and the second pipe and the first segment are parallel to each other, and the second pipe and the water outlet pipe are on the same line.

3. The two-waterway structure according to claim 1, wherein the filter structure comprises a main body that is cylinder-shaped, a plurality of filter holes being formed in the main body.

4. The two-waterway structure according to claim 3, wherein a cylindrical opening of the main body faces the one-way valve, the main body is connected to the one-way valve, and a wall at the junction of the three-way pipe structure is capable of supporting an end of the main body opposite to the cylindrical opening of the main body.

5. The two-waterway structure according to claim 4, wherein the three-way pipe structure is capable of holding the main body to prevent the main body from wobbling in a direction perpendicular to the end portion of the first pipe.

6. The two-waterway structure according to claim 4, further comprising a plug cap, wherein a mounting port is provided at the three-way pipe structure and extends through the wall at the junction of the three-way pipe structure, such that the junction of the three-way pipe structure is in communication with the outside via the mounting port, and the plug cap is detachably arranged at the mounting port to plug the mounting port, such that the plug cap forms a portion of the wall at the junction of the three-way pipe structure.

7. The two-waterway structure according to claim 6, wherein the plug cap is in threaded connection with the mounting port.

8. The two-waterway structure according to claim 6, wherein the filter structure further comprises a bottom support structure arranged on an outer surface of the main body and configured to abut against the plug cap to support the main body.

9. The two-waterway structure according to claim 5, wherein the filter structure further comprises a side support structure arranged on the outer surface of the main body and configured to abut against the wall of the three-way pipe structure to prevent the main body from wobbling in the direction perpendicular to the end portion of the first pipe connected to the water outlet pipe.

* * * * *